United States Statutory Invention Registration [19]

[11] Reg. Number: H590

Chiles et al.

[43] Published: Feb. 7, 1989

[54] HIGH-EFFICIENCY SCINTILLATION DETECTOR FOR COMBINED OF THERMAL AND FAST NEUTRONS AND GAMMA RADIATION

[75] Inventors: Marion M. Chiles, Knoxville; John T. Mihalczo; Edward D. Blakeman, both of Oak Ridge, all of Tenn.

[73] Assignee: The United States of America as represented by the Department of Energy, Washington, D.C.

[21] Appl. No.: 19,738

[22] Filed: Feb. 27, 1987

[51] Int. Cl.[4] ..... G01T 1/20

[52] U.S. Cl. ..... 250/367; 250/390 F; 250/390

[58] Field of Search ..... 250/367, 390 J, 390 F

[56] References Cited

U.S. PATENT DOCUMENTS

| | | | |
|---|---|---|---|
| 2,910,592 | 10/1959 | Armistead | 250/367 |
| 3,786,253 | 1/1974 | Haffner et al. | 250/390 J |
| 3,988,586 | 10/1976 | Stuart et al. | 250/367 |
| 4,217,497 | 8/1980 | Daniels et al. | 250/390 F |
| 4,292,538 | 9/1981 | Carlson | 250/367 |
| 4,323,778 | 4/1982 | Wykes et al. | 250/367 |

OTHER PUBLICATIONS

Jaszczak et al., "Fast Neutron and Gamma Ray Rise-time Differences for 8 to 10 MeV Pulses in Large NaI(T1) Crystal", *The Review of Scientific Instruments* vol. 41, No. 1 Jan. 1970, pp. 28–30.

*Primary Examiner*—Stephen C. Buczinski
*Assistant Examiner*—Linda J. Wallace
*Attorney, Agent, or Firm*—David E. Breeden; Stephen D. Hamel; Judson R. Hightower

[57] ABSTRACT

A scintillation based radiation detector for the combined detection of thermal neutrons, high-energy neutrons and gamma rays in a single detecting unit. The detector consists of a pair of scintillators sandwiched together and optically coupled to the light sensitive face of a photomultiplier tube. A light tight radiation pervious housing is disposed about the scintillators and a portion of the photomultiplier tube to hold the arrangement in assembly and provides a radiation window adjacent the outer scintillator through which the radiation to be detected enters the detector. The outer scintillator is formed of a material in which scintillations are produced by thermal-neutrons and the inner scintillator is formed of a material in which scintillations are produced by high-energy neutrons and gamma rays. The light pulses produced by events detected in both scintillators are coupled to the photomultiplier tube which produces a current pulse in response to each detected event. These current pulses may be processed in a conventional manner to produce a count rate output indicative of the total detected radiation even count rate. Pulse discrimination techniques may be used to distinguish the different radiations and their energy distribution.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

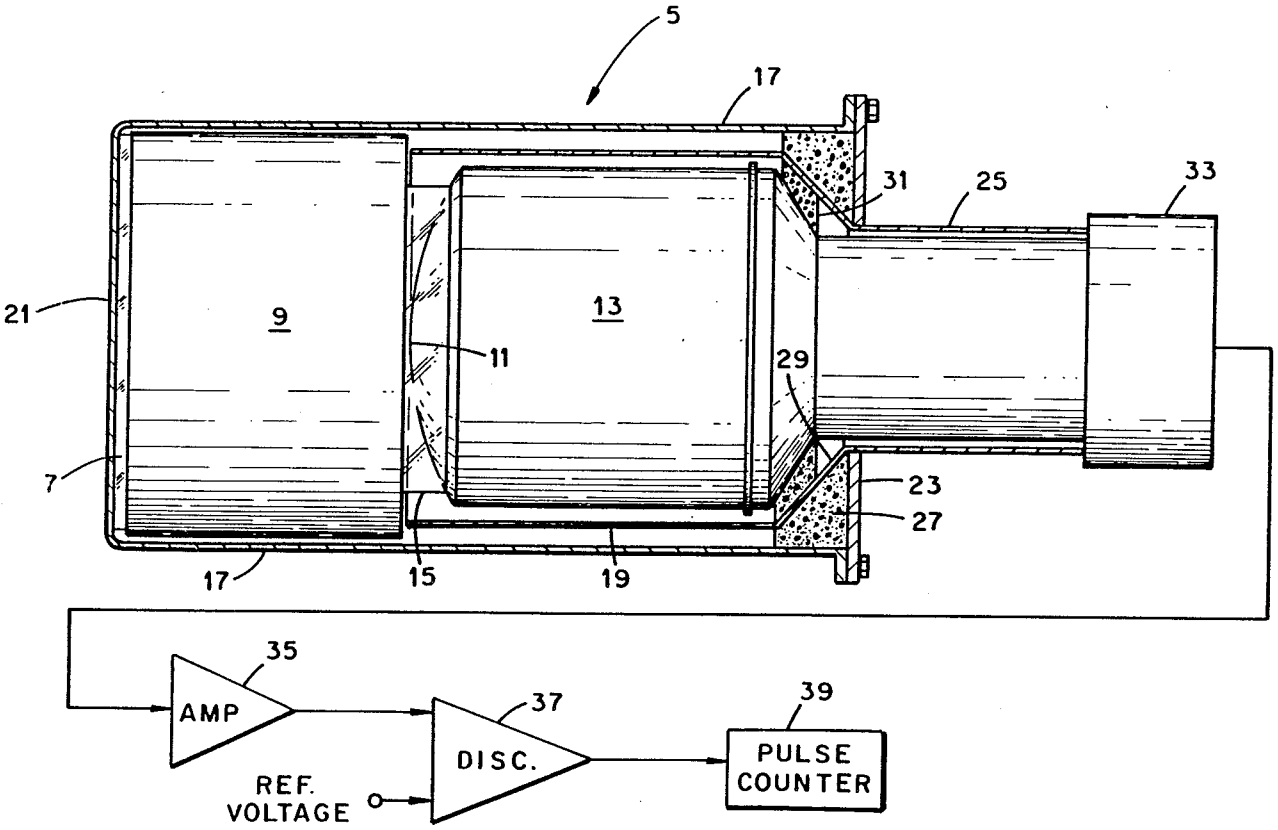
5
17
33
25
31
23
27
29
13
19
11
15
9
17
21
7
35
AMP
37
DISC.
39
PULSE COUNTER
REF. VOLTAGE

HIGH-EFFICIENCY SCINTILLATION DETECTOR FOR COMBINED OF THERMAL AND FAST NEUTRONS AND GAMMA RADIATION

This invention, which is a result of a contract with the U.S. Department of Energy, relates generally to the art of radiation detection for detecting neutrons and gamma radiation and more specifically to scintillation based radiation detection.

BACKGROUND OF THE INVENTION

There are several applications such as space research, health physics, and subcriticality experiments where there is a need for a high-efficiency radiation detector that is sensitive to neutrons over a wide energy range and gamma radiation. The need for such a detector arises from various requirements including physical limitations, cost effectiveness, and simplicity.

SUMMARY OF THE INVENTION

In view of the above need, it is an object of this invention to provide a high efficiency single radiation detector which can he used to detect both thermal and fast neutrons and gamma radiation.

Other objects and many of the attendant advantages of the present invention will be obvious to those skilled in the art from the following detailed description taken in conjunction with the drawing.

In summary, the invention pertains to a scintillation based radiation detector for detecting both thermal and fast neutrons and gamma radiation including a first scintillator responsive to thermal neutrons, a second scintillator responsive to fast neutrons and gamma radiation arranged in a sandwiched assembly optically coupled to the light sensitive face of a photomultiplier tube. A portion of the tube and the scintillators are enclosed within a light tight, radiation pervious housing. Radiation entering through a front window formed by the housing first interacts with the first scintillator which is formed of a material having a thickness sufficient to stop all thermal neutrons while allowing fast neutrons and gamma radiation to pass therethrough into the second scintillator which has a thickness sufficient to stop a large fraction of the fast neutron and gamma radiation. Scintillations produced in both scintillators are detected by the photomultiplier tube which produces current pulses at a rate corresponding to the total detected radiation event rate. These pulses may be processed in a conventional manner to provide a readout of the total combined radiation events detected. Pulse shaping discrimination can be used to distinguish the fast neutrons, thermal neutrons, and gamma rays. In addition, the energy spectra of the fast neutrons and gamma rays may be measured.

BRIEF DESCRIPTION OF THE DRAWING

The single FIGURE is a schematic diagram illustrating a scintillation detector made in accordance with the present invention for detecting both thermal and fast neutrons and gamma radiation.

DETAILED DESCRIPTION OF THE PREFERRED EMBODIMENT

Referring now to the drawing, a detector 5 made in accordance with the present invention is shown. The detector includes a thin glass scintillator 7 responsive to thermal neutrons and optically coupled to a thick plastic scintillator 9 responsive to high-energy neutrons and gamma rays. The plastic scintillator is optically coupled to the light sensitive face 11 of a photomultiplier tube 13 by means of a light coupling lens 15. The lens 15 is formed with a flat front face which is disposed against the back side of scintillator 9 and a concave back surface which is disposed against the light-sensitive, convex face surface 11 of the photomultiplier 13. The scintillators 7 and 9 are assembled in a sandwiched arrangement with the lens 15 using an optical coupling compound, such as a silicone based compound No. C-20057 available from the Dow Corning Corporation, Midland, Mich., between each element and the face 11 of the photomultiplier 13. This arrangement is held in assembly by means of a rectangular, light-tight housing 17 which surrounds the scintillators 7 and 9 and a portion of the outer, opaque magnetic shield 19 of the photomultiplier tuhe assembly. The assembled detector arrangement is inserted into the aluminum housing with the outer scintillator 7 against the front portion of the housing forming a radiation pervious detector window 21 through which the radiation to be detected enters the detector. The housing is held in place against the photomultiplier assembly by means of a hack cover plate 23 having a central opening which fits about the rearward extending neck portion 25 of the housing 17 in a press fit arrangement against a foam rubber spacing and insulting collar 27. The collar 27 is shaped to compress against the shoulder portion 29 of the photomultiplier shield 19 and form a light tight fit between the housing and the tube shield 19 when the cover 23 is attached to the housing wall portion, as shown. An additional foam rubber spacing collar 31 may be inserted between the shield 19 and the tube body 13 at the shoulder region to prevent displacement of the shield 19 relative to the tube body 13.

The output of the photomultiplier tube, availahle at a rear connector 33 of the tube, consists of current pulses produced at a rate corresponding to the total combined radiation event count rate and an amplitude proportional to the energy of the detected radiation event. This output may be connected to a pulse processing system to count or store the pulse information as in a conventional detection system. For example, the output may be connected through a broadband amplifier 35 to one input of a fast discriminator 37. The amplitude of the pulses from the amplifier is compared to a reference voltage applied to the reference voltage input of the discriminator 37 and produces an output count pulse for each input pulse which exceeds the reference voltage threshold. The discriminator reference is typically set at a voltage which eliminates the counting of noise pulses produced in the photomultiplier 13. The count pulses from the discriminator may be registered in various ways as by feeding the pulses directly to a display pulse counter 39 or storing the pulses in digital form in a computer based analyzer for later analysis.

Referring again to the scintillators 7 and 9, the particular scintillating materials used may vary as long as the requirements of detection for each medium is met. Specifically, the first scintillator 7 must be formed of a material having a large thermal neutron cross-section and a thickness sufficient to absorb all thermal neutrons of the radiation to be detected while allowing high-energy neutrons and gamma rays to pass therethrough. Similarly the second scintillator 9 must be formed of a material having a large cross-section for high-energy neutrons and gamma rays and sufficient thickness to absorb these radiations. Thus, it will be seen that a scintillation is produced in the first scintillator 7 for each detected thermal neutron and a scintillation is produced in the second scintillator 9 for each high-energy neutron or gamma ray detected. The light pulses produced hy scintillations in each scintillator are optically coupled to the photomultiplier to produce output current pulses indicative of the total combined radiation detection rate.

In the illustrated emhodiment, the first scintillator 7 is formed of an optical quality glass doped with lithium at a concentration of at least 7.5% which has been enriched in lithium-6 ($^6$Li) to at least 95%. This scintillator is 5.9 inches square and 5 mm thick. A scintillator of this type is manufactured hy the Levy West Co., a British company, and available through the BICRON Corp., Newherry, Ohio. It is identified as a glass scintillator, Type KG2 and is available in the size specified above. The second scintillator is formed of an appropriate organic plastic scintillating material having a large cross-section for high-energy neutrons and gamma rays. One such scintillator is the Model No. BC-420 plastic scintillator available from BICRON Corp. This plastic scintillator has a 6-inch square cross-section and is 4 inches thick, which is sufficient for the detection of high-energy neutrons and gamma rays. Other plastic or liquid scintillators such as NE 213 may also he used for the second scintillator which is responsive to both high-energy neutrons and gamma ray radiations.

In the arrangement shown the thicker plastic scintillator 9 also serves as a light guide for guiding the light pulses produced by scintillations occurring in the front glass scintillator 7 to the photomultiplier face 11. The photomultiplier used is a standard 5-inch nominal diameter tube size.

Tests of the above described detector were made using calibrated sources of neutrons and gamma rays to determine the detector efficiency, or efficiency factor, i.e. the number of counts produced per unit number of radiations that impinge upon the detector. Thermal neutrons having energies up to 0.2 eV are detected with an efficiency of $\geqq$95%, those up to 1 eV with an efficiency of $\geqq$75%, and those up to 4 eV with an efficiency of $\geqq$50%. Fast neutrons having energies of fission neutron spectrums in the range of from 0.2 to 5 MeV were detected with detector efficiency factors of at least 11%. Gamma radiation from a source having an energy of 0.66 MeV was detected with a detector efficiency factor of at least 15%.

Thus, it will be seen that a highly efficient detector has been provided for the combined detection of both thermal and fast neutrons and gamma radiations in a single detector. In the past, individual detectors have been required to detect each type of radiation. The dual scintillator detector may be used for any application where high efficiency is required. It has considerable advantage over conventional detectors for detecting all energies of neutrons and gamma rays from fission reactions or accelerator targets. The detector is extremely valuable where physical limitations near or inside experimental facilities prevent the positioning of multiple detectors.

Although the invention has been illustrated by means of a specific embodiment, it will be obvious to those skilled in the art that various modifications and changes may be made therein without departing from the spirit and scope of the invention as set forth in the claims appended hereto.

We claim:

1. A radiation detector for the combined detection of thermal neutrons, high-energy neutrons and gamma ray radiations, comprising:

a first scintillator means disposed to receive said radiations entering said detector through an entrance area thereof for producing scintillations in response to thermal neutrons absorbed therein and allowing said high energy neutrons and gamma rays to pass therethrough;

a second scintillator means disposed adjacent said first scintillator means to receive said high-energy neutrons and gamma rays passing through said first scintillator means for producing scintillations therein in response to high-energy neutrons and gamma rays absorbed therein and optically coupled to said first scintillator means for guiding light pulses therethrough generated by said scintillations produced in said first scintillator means;

a photomultiplier tube having a light sensitive face optically coupled to said second scintillator means for receiving light pulses generated by said scintillations produced in said first and second scintillator means and producing current pulses at an output thereof in response to each of said generated light pulses indicative of the total combined radiation count rate; and a light-tight housing disposed about said first and second scintillator means and said light sensitive face of said photomultiplier and having a radiation pervious window therein forming said entrance area of said detector.

2. The radiation detector as set forth in claim 1 wherein said first scintillator means includes a $^6$Li doped glass scintillator having sufficient thickness to absorb said thermal neutron radiation.

3. The radiation detector as set forth in claim 2 wherein said second scintillator means includes an organic plastic scintillator having sufficient thickness to absorb both said high-energy neutrons and said gamma ray radiations.

4. The radiation detector as set forth in claim 3 further including an optical coupling lens disposed between said second scintillator means and said light sensitive face of said photomultiplier tube and wherein said first and second scintillator means and said coupling lens are serially aligned in a sandwiched assembly between said radiation entrance window of said housing and said light sensitive face of said photomultiplier tube.

5. The detector as set forth in claim 4 wherein said housing is disposed about a portion of said photomultiplier tube in a light tight arrangement to hold said first and second scintillator means and said optical coupling lens in assembly against said light sensitive face of said photomultiplier tube.

6. The detector as set forth in claim 5 further including recording means responsive to said current pulses at the output of said photomultiplier tube for recording said pulses as an indication of the total detected radiation count rate.

* * * * *